(12) United States Patent
Kim et al.

(10) Patent No.: US 9,914,423 B2
(45) Date of Patent: Mar. 13, 2018

(54) SIDE CURTAIN AIRBAG FOR VEHICLE

(71) Applicant: Autoliv Development AB, Vårgårda (SE)

(72) Inventors: Chi Ho Kim, Hwaseong-si (KR); Tae Ik Gwon, Hwaseong-si (KR); Yong Hyun Jung, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/325,753

(22) PCT Filed: Apr. 8, 2015

(86) PCT No.: PCT/KR2015/003539
§ 371 (c)(1),
(2) Date: Jan. 12, 2017

(87) PCT Pub. No.: WO2016/010233
PCT Pub. Date: Jan. 21, 2016

(65) Prior Publication Data
US 2017/0151925 A1    Jun. 1, 2017

(30) Foreign Application Priority Data
Jul. 14, 2014    (KR) .................. 10-2014-0088489

(51) Int. Cl.
*B60R 21/207* (2006.01)
*B60R 21/232* (2011.01)
(Continued)

(52) U.S. Cl.
CPC .......... *B60R 21/232* (2013.01); *B60R 21/213* (2013.01); *B60R 21/233* (2013.01); *B60R 21/2342* (2013.01); *B60R 2021/23308* (2013.01)

(58) Field of Classification Search
CPC combination set(s) only.
See application file for complete search history.

(56) References Cited

U.S. PATENT DOCUMENTS 6,234,516 B1 *   5/2001   Boxey .................. B60R 21/232
                                                    280/729
8,186,710 B2 *   5/2012   Cheal .................. B60R 21/213
                                                    280/729
(Continued)

FOREIGN PATENT DOCUMENTS

| EP | 2617607 B1 * | 7/2016 | .......... B60R 21/233 |
| GB | 2532976 A * | 6/2016 | .......... B60R 21/233 |
| WO | WO-2016153175 A1 * | 9/2016 | .......... B60R 21/232 |

OTHER PUBLICATIONS

International Search Report and Written Opinion of the ISA for PCT/KR2015/003539, ISA/KR, Daejeon, Korea, dated Aug. 13, 2015.

*Primary Examiner* — Nicole T Verley
(74) *Attorney, Agent, or Firm* — Stephen T. Olson; Harness, Dickey & Pierce, P.L.C.

(57) ABSTRACT

A side curtain airbag for a vehicle includes a serial main chamber that inflates and deploys along an interior side surface of the vehicle; a protruding chamber disposed at a front side of the main chamber to further protrude toward an interior of the vehicle relative to the main chamber; and a cutting line arranged between the main chamber and the protruding chamber to partially separate the protruding chamber from the main chamber such that the protruding chamber overlaps with a portion of the main chamber upon non-inflation of the airbag. In this configuration, upon a vehicle collision, the head portion of the occupant is prevented early from being ejected toward the front of the vehicle.

20 Claims, 8 Drawing Sheets

(51) Int. Cl.
  *B60R 21/213* (2011.01)
  *B60R 21/2342* (2011.01)
  *B60R 21/233* (2006.01)

(56) References Cited

U.S. PATENT DOCUMENTS

| | | | | |
|---|---|---|---|---|
| 8,590,926 B2* | 11/2013 | Saimura | B60R 21/232 | 280/730.2 |
| 8,899,617 B2* | 12/2014 | Fukawatase | B60R 21/232 | 280/730.2 |
| 8,967,660 B2* | 3/2015 | Taguchi | B60R 21/233 | 280/729 |
| 9,114,776 B2* | 8/2015 | Thomas | B60R 21/2338 | |
| 9,114,777 B2* | 8/2015 | Fukawatase | B60R 21/232 | |
| 9,126,558 B2* | 9/2015 | Kawamura | B60R 21/213 | |
| 9,487,180 B2* | 11/2016 | Nakashima | B60R 21/233 | |
| 9,539,978 B2* | 1/2017 | Mazanek | B60R 21/232 | |
| 9,610,916 B2* | 4/2017 | Kawamura | B60R 21/232 | |
| 9,650,010 B2* | 5/2017 | Wang | B60R 21/216 | |
| 2004/0017067 A1* | 1/2004 | Daines | B60R 21/232 | 280/730.2 |
| 2006/0097492 A1* | 5/2006 | Bakhsh | B60R 21/232 | 280/730.2 |
| 2007/0013173 A1* | 1/2007 | Kino | B60R 21/213 | 280/729 |
| 2008/0012275 A1* | 1/2008 | Pinsenschaum | B60R 21/232 | 280/730.2 |
| 2008/0129023 A1* | 6/2008 | Heigl | B60R 21/232 | 280/730.1 |
| 2009/0014989 A1* | 1/2009 | Henderson | B60R 21/232 | 280/730.2 |
| 2010/0264630 A1 | 10/2010 | Walston | | |
| 2011/0079990 A1* | 4/2011 | Cheal | B60R 21/213 | 280/730.2 |
| 2013/0001933 A1 | 1/2013 | Umehara et al. | | |
| 2013/0270805 A1* | 10/2013 | Kruse | B60R 21/232 | 280/730.2 |
| 2014/0035265 A1 | 2/2014 | Nakashima et al. | | |
| 2014/0042732 A1* | 2/2014 | Taguchi | B60R 21/233 | 280/729 |
| 2014/0217710 A1* | 8/2014 | Fukawatase | B60R 21/233 | 280/730.2 |
| 2014/0239619 A1* | 8/2014 | Fukawatase | B60R 21/232 | 280/730.2 |
| 2015/0115581 A1* | 4/2015 | Mazanek | B60R 21/232 | 280/730.2 |
| 2016/0001732 A1* | 1/2016 | Asada | B60R 21/232 | 280/729 |
| 2016/0107600 A1* | 4/2016 | Lee | B60R 21/232 | 280/729 |
| 2016/0107602 A1* | 4/2016 | Nakashima | B60R 21/233 | 280/728.2 |
| 2016/0288762 A1* | 10/2016 | Deng | B60R 21/0136 | |

* cited by examiner

[FIG. 1]
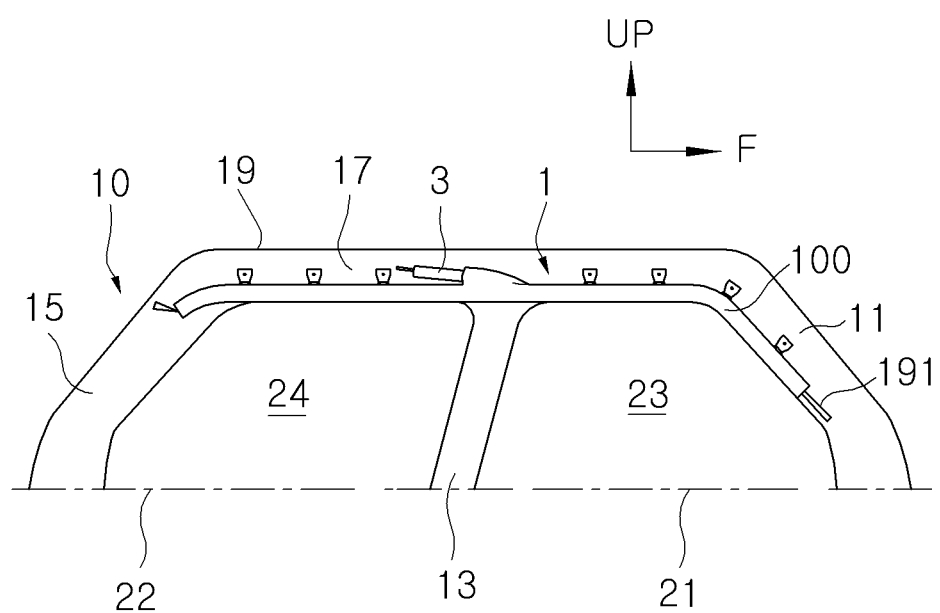

【FIG. 2】
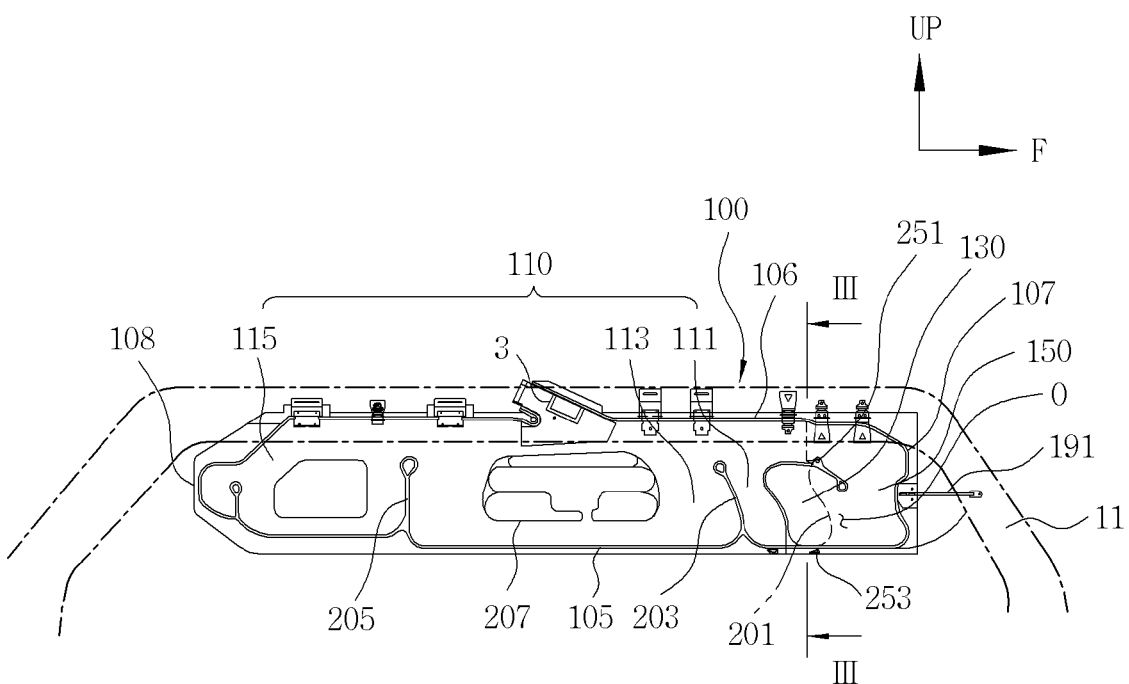

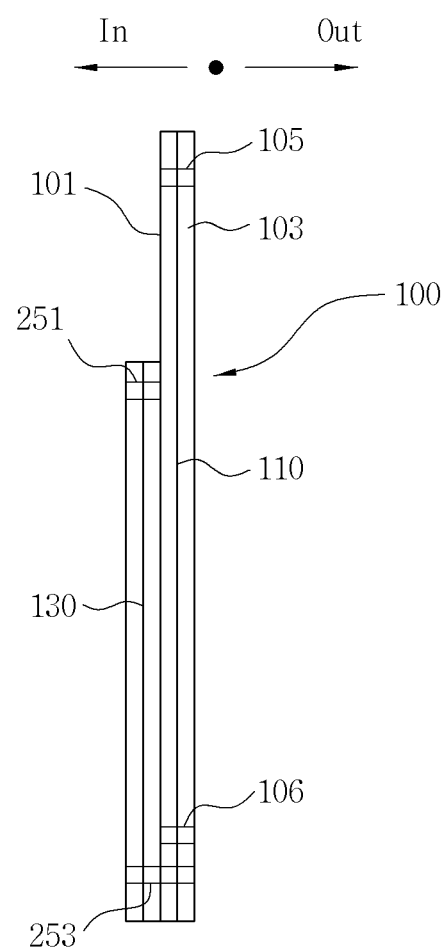
[FIG. 3]

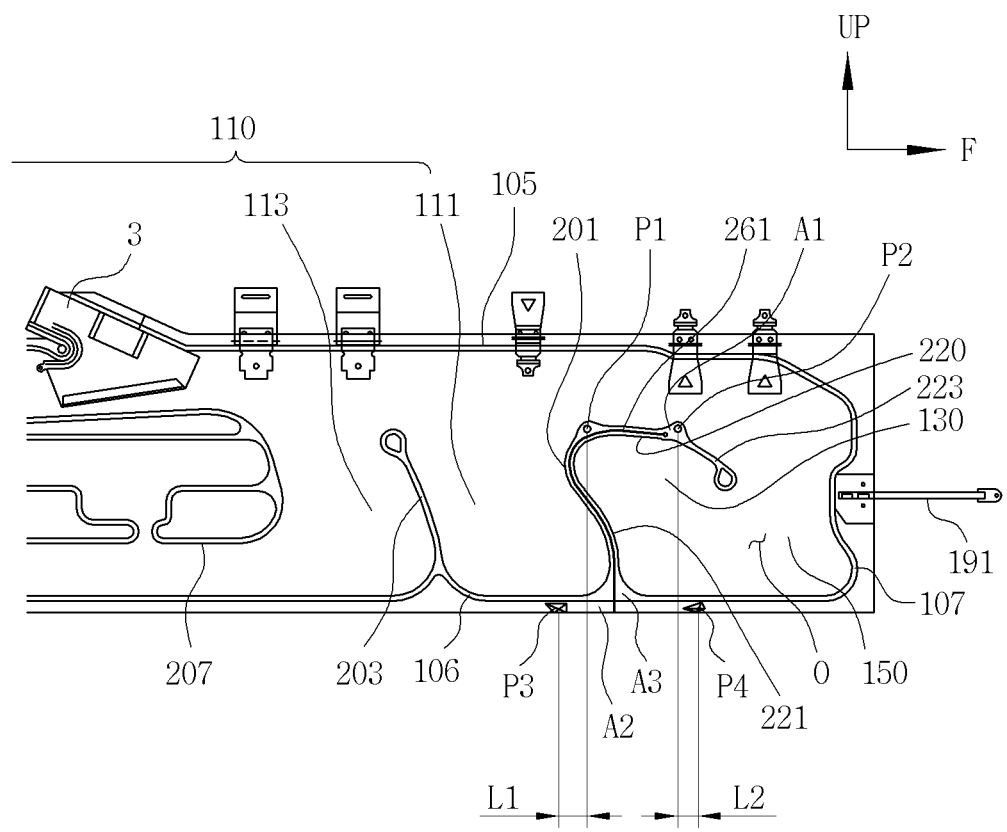
[FIG. 4]

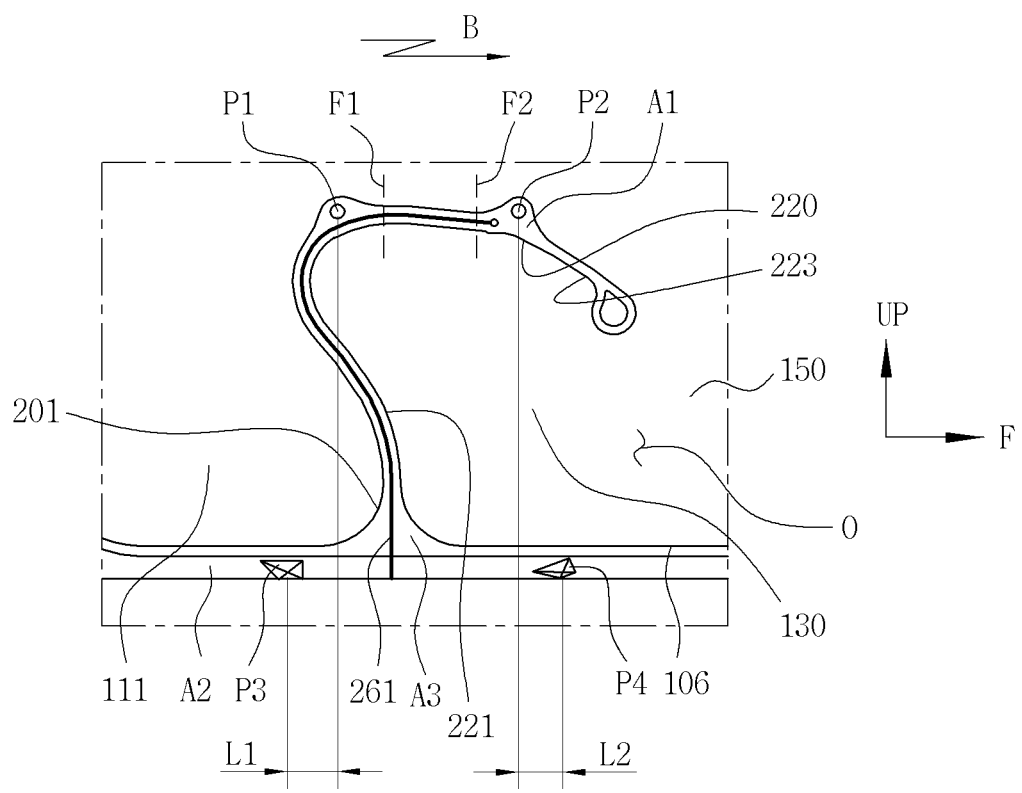
[FIG. 5]

[FIG. 6]
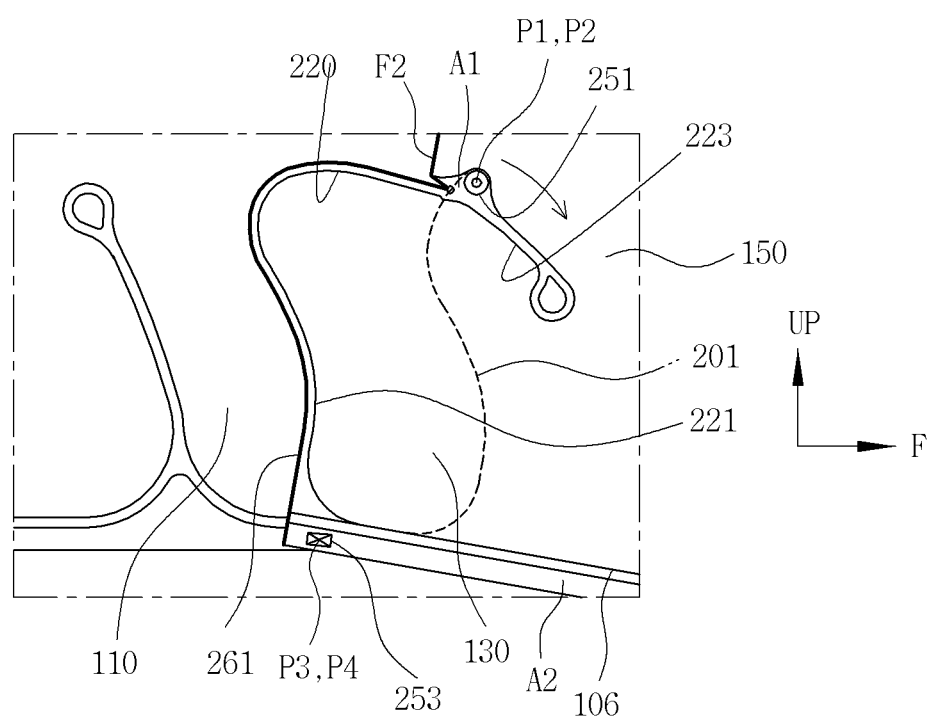

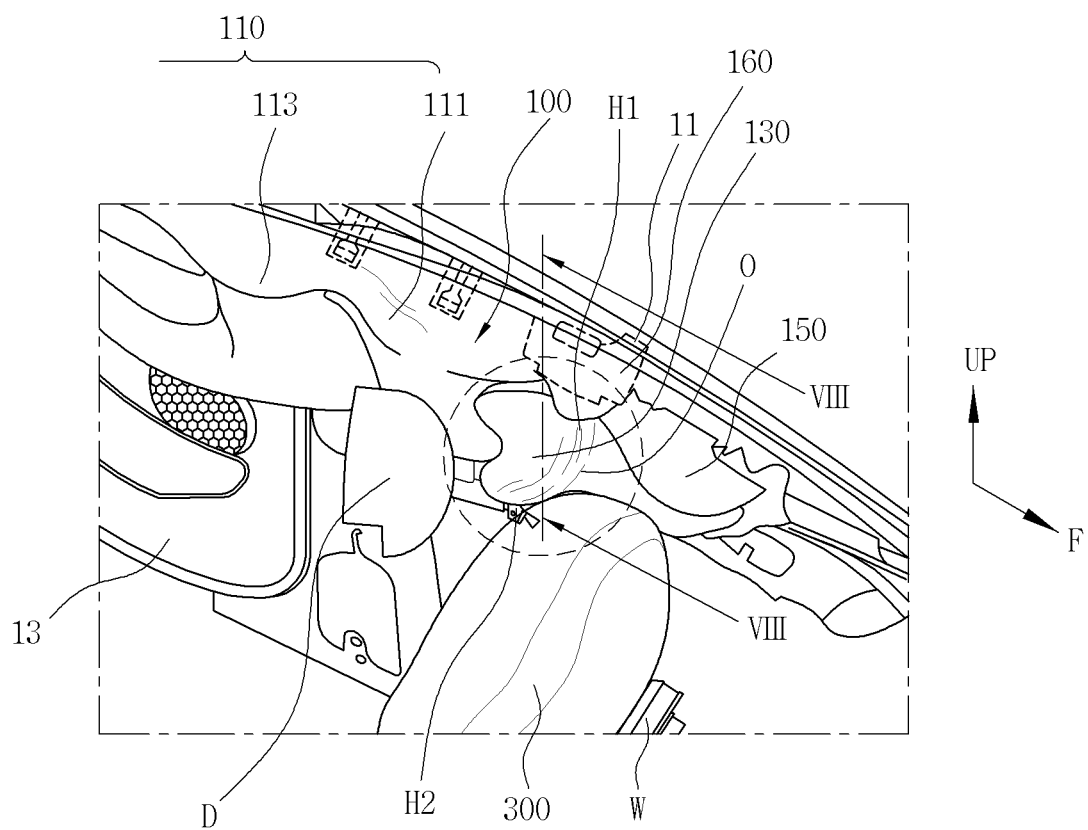
[FIG. 7]

[FIG. 8]
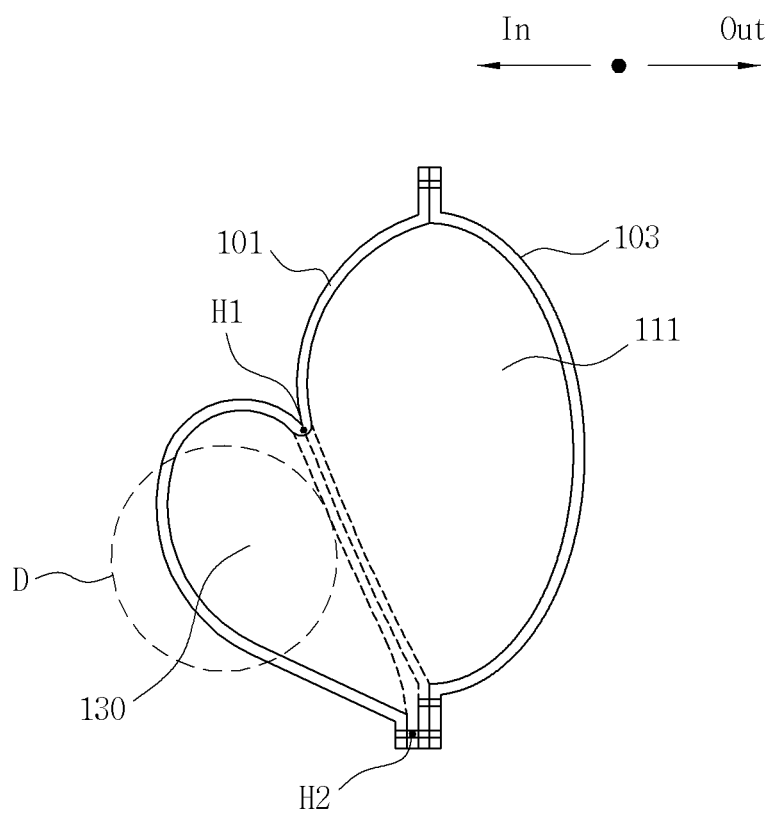

SIDE CURTAIN AIRBAG FOR VEHICLE

CROSS-REFERENCE TO RELATED APPLICATIONS

This application is a 371 U.S. National Stage of International Application No. PCT/KR2015/003539, filed Apr. 8, 2015, which claims the benefit of and priority to Korean Patent Application No. 10-2014-0088489, filed Jul. 14, 2014. The entire disclosures of the above applications are incorporated herein by reference.

TECHNICAL FIELD

The present invention relates to a side curtain airbag for a vehicle, which is configured to inflate and deploy along an interior side surface of the vehicle upon a vehicle side impact collision or rollover.

BACKGROUND ART

In recent years, high levels of safety performance of vehicles have been required. This trend is shared across countries around the world, where most vehicles are currently standard-equipped with airbags as vehicle safety devices. Firms involved in vehicle development have adopted ongoing safety improvement as a major development guideline. In keeping with this new airbags are continually being developed.

Standards for evaluating vehicle safety differ from country to country, and firms approach product development such that products can meet evaluation standards in multiple countries. In the United States, for instance, which has the largest automobile fleet in the world Federal Motor Vehicle Safety Standards (FMVSS) are issued by the National Highway Traffic Safety Administration (NHTSA). In a Notice of Proposed Rulemaking (NPRM) for FMVSS, a requirement is proposed that aims at "reducing the probability of occupant ejection from a vehicle through a side window using an ejection mitigation system in the event of a side impact or rollover". The requirement can be met by providing a side curtain airbag as a device intended to reduce ejection from a vehicle, such that the side curtain airbag constitutes the ejection mitigation system.

The side curtain airbag for the vehicle is transversely lengthily installed at the upper end in the vehicle so as to inflate and deploy upon a vehicle collision. The side curtain airbag provides high levels of safety performance upon a rollover as well as a side impact collision of the vehicle.

When an inflator is operated according to an impact signal, the gas generated from the inflator is introduced into the curtain airbag to inflate the curtain airbag, and the inflated curtain air bag is deployed in the vehicle to protect the occupant from a vehicle impact.

In general, the inflator is disposed at the upper rear portion or central portion of the curtain airbag such that gas generated from the inflator flows in the inflatable chamber so as to inflate the inflatable chamber.

DISCLOSURE OF INVENTION

Technical Problem

An object of the present invention is to provide a side curtain airbag for a vehicle, which includes a protruding chamber further protruding toward the interior of the vehicle relative to a main chamber inflating and deploying along a side window of the vehicle upon a vehicle side impact or rollover so as to early prevent ejection of the occupant.

Another object of the present invention is to provide a side curtain airbag for a vehicle, which can block off a gap between a curtain airbag and a driving seat side airbag so as to prevent a head portion of the occupant from being ejected toward the front side of the vehicle through the gap between the curtain airbag and the driving seat side airbag.

Solution to Problem

According to an embodiment of the invention, there is provided a curtain airbag for a vehicle. The airbag includes: a serial main chamber that inflates and deploys along an interior side surface of the vehicle; a protruding chamber disposed at a front side of the main chamber to further protrude toward an interior of the vehicle, relative to the main chamber; and a cutting line arranged between the main chamber and the protruding chamber to partially separate the protruding chamber from the main chamber such that the protruding chamber overlaps with a portion of the main chamber upon non-inflation of the airbag.

The airbag may further include a foremost chamber extending from a front end of the main chamber toward the front side of the vehicle to be downwardly deployed from a front pillar of the vehicle, wherein the protruding chamber may be disposed between the main chamber and the foremost chamber.

The protruding chamber may be defined by a protruding chamber wall, and the protruding chamber wall may include a vertical wall protruding upwardly from a lower portion of the airbag; and a transverse wall extending from a top end of the vertical wall toward the front side of the vehicle and spaced from the upper end of the curtain airbag by a predetermined distance, wherein the cutting line may be formed in a non-inflation area around the vertical wall and the transverse wall.

A first upper point and a second upper point in a non-inflation area above the transverse wall may be coupled to each other by a first connecting means after an upper portion above the transverse wall may be folded through at least one folding line; and a first lower point in a non-inflation area below the main chamber and a second lower point in a non-inflation area below the protruding chamber may be coupled to each other by a second connecting means after the protruding chamber and the main chamber overlap each other.

The first lower point may be disposed at a location which is spaced by a first distance from the first upper point toward a rear side of the vehicle, and the second lower point may be disposed at a location which is spaced by a second distance from the second upper point toward the front side of the vehicle.

The upper portion above the transverse wall may be folded in a zigzag direction such that the second upper point is moved in a rear direction of the vehicle.

The protruding chamber may be configured such that a front side of the protruding chamber is supported by a driving seat side airbag inflated and deployed from a steering wheel body of the vehicle.

Advantageous Effects of Invention

According to an embodiment of the invention, upon a vehicle collision, the head portion of the occupant is early prevented from being ejected toward the front side of the vehicle by the protruding chamber.

According to an embodiment of the invention, upon inflation of the airbag, the protruding chamber is supported by the driving seat side airbag. Accordingly, the gap between the curtain airbag and the driving seat side curtain airbag is blocked off, thereby enhancing the effect of protecting the head portion of the occupant.

BRIEF DESCRIPTION OF DRAWINGS

FIG. 1 is a side view showing a configuration of a side curtain airbag for a vehicle according to an embodiment of the present invention.

FIG. 2 is a view showing an unfolded state of a non-inflated side curtain airbag for a vehicle according to an embodiment of the present invention.

FIG. 3 is a sectional view taken along the line III-III of FIG. 2.

FIG. 4 is a view showing a state that a portion where the protruding chamber of FIG. 2 is formed is fully un-folded.

FIG. 5 is a partial side view showing a state that a protruding chamber of a side curtain airbag for a vehicle is unfolded according to an embodiment of the present invention.

FIG. 6 is a partial side view showing a state that a protruding chamber of a side curtain airbag for a vehicle overlaps with a main chamber according to an embodiment of the present invention.

FIG. 7 is a view showing an inflated state of the side curtain airbag for a vehicle according to an embodiment of the present invention.

FIG. 8 is a sectional view taken along the line VIII-VIII of FIG. 7.

MODE FOR THE INVENTION

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

In the following descriptions, a transverse direction refers to a forward-rearward direction of the vehicle, along which a side curtain airbag according to an embodiment of the invention is installed, and a vertical direction refers to an upward-downward direction of the vehicle, along which the side curtain airbag according to an embodiment of the invention is deployed in the vehicle.

Hereinafter, side curtain airbags for a vehicle according to various exemplary embodiments of the invention will be described, which are substantially installed at a lateral portion of a roof panel in a folded state so as to extend from a front pillar of the vehicle to a rear pillar, so that the side curtain airbags are inflated and deployed along an interior side surface of the vehicle in a curtain shape upon a side impact collision or rollover.

A vehicle includes at least two pillars for supporting a roof of the vehicle. A sedan vehicle includes three pillars, and the three pillars are generally called A, B and C pillars. Meanwhile, a wagon vehicle further includes a D pillar adjacent to a back-door of the vehicle. Hereinafter, the sedan vehicle including the three pillars will be described as one example.

FIG. 1 is a side view showing a configuration of a side curtain airbag for a vehicle according to an embodiment of the present invention.

Referring to FIG. 1, a side curtain airbag apparatus 1 is installed at a roof side rail 3 located at an upper edge above a window of a vehicle body 10 in an unfolded state along the transverse direction.

The vehicle body 10 includes a front pillar 11, a center pillar 13, a rear pillar 15, and a roof side rail 17 coupled to the respective upper ends of the pillars 11, 13, and 15. The roof side rail 17 extends along the forward-rearward direction of the vehicle 10 to support a roof 19. The roof side rail 17 is installed along the edge of the roof 19.

The vehicle body 10 includes a front side door 21 installed between the front pillar 11 and the center pillar 13 and a rear side door 22 installed between the center pillar 13 and the rear pillar 17. A front window 23 is arranged at an upper portion of the front side door 21, and a rear window 24 is arranged at an upper portion of the rear side door 22.

The side curtain airbag apparatus 1 is installed in the roof side rail 17. The side curtain airbag apparatus 1 includes a side curtain airbag 100 (hereinafter referred to as "airbag") mounted to the roof side rail 17 in a folded state along upper edges of the front and rear side windows 23 and 24, and an inflator 3 to generate gas upon a vehicle collision.

The inflator 3 is coupled to an upper central portion of the airbag 100. In another embodiment, the inflator 3 may be coupled to an upper rear end or an upper front end of the airbag 100.

When the impact of more than a predetermined level is applied to the lateral part of the vehicle 10, the gas is generated from the inflator 3, and the gas generated from the inflator 3 is supplied into the airbag 100. The airbag 100 is downwardly deployed along the front side window 23 and rear side window 24.

FIG. 2 is a side view showing an unfolded state of a non-inflated side curtain airbag according to an embodiment of the present invention, and FIG. 3 is a sectional view taken along the line III-III of FIG. 2.

Referring to FIGS. 2 and 3, the airbag 100 includes an inner panel 101 and an outer panel 103 which face each other. The inner and outer panels 101 and 103 include a material having airtightness and flexibility. An upper wall 105, a lower wall 106, a front wall 107, and a rear wall 108 are formed along edges of the inner and outer panels 101 and 103 so as to form a basic chamber into which gas flows.

The airbag 100 includes a serial main chamber 110 which deploys along an interior side surface of the vehicle, such as the front and rear side windows 23 and 24 and at least one protruding chamber 130 protruding toward the interior of the vehicle, relative to the main chamber 110 upon inflation of the airbag 100.

The protruding chamber 130 is configured to early prevent the head portion of the occupant from being ejected toward the front side of the vehicle upon a vehicle collision.

The airbag 100 further includes a foremost chamber 150 extending from the front end of the main chamber 110 toward the front side of the vehicle. The foremost chamber 150 is downwardly inflated and deployed from the front pillar 11 of the vehicle.

Since the protruding chamber 130 is interposed between the main chamber 110 and the foremost chamber 150, upon inflation and deployment of the airbag 110, the protruding chamber 130 further protrudes toward the interior of the vehicle relative to the main chamber 110 and the foremost chamber 150.

The protruding chamber 130 is configured to partially overlap with the front portion of the main chamber 110. In another embodiment of the invention, the protruding chamber 130 may be disposed at the rear seat side of the vehicle, so that the head portion of the occupant seated on the rear seat of the vehicle can be prevented from being ejected toward the front of the vehicle.

For example, the main chamber 110 includes a front chamber 111 disposed at the front side of the vehicle, a middle chamber 113 which substantially corresponds to the center pillar 13 of the vehicle, and a rear chamber 115 disposed at the rear side of the vehicle.

The protruding chamber 130 is configured to overlap with the inner panel 101 of the front chamber 111. Through this configuration, upon early deployment of the airbag, the protruding chamber 130 is deployed while protruding toward the rear side of the vehicle. Accordingly, the head portion of the occupant can be early prevented from being ejected toward the front side of the vehicle.

The front chamber 111, the middle chamber 113, and the rear chamber 115 are defined by main chamber walls 201, 203, and 205. The foremost chamber 150 and the protruding chamber 130 are defined by a protruding chamber wall 220. The middle chamber 113 is disposed adjacent to the center pillar 13 of the vehicle and substantially includes a "U" shape defined by a closed chamber wall 207 having a substantially square shape.

The main chamber walls 201, 203, and 205, the protruding chamber wall 220, and the closed chamber wall 207 may be formed by sewing or bonding the inner and outer panels 101 and 103 after the inner and outer panels 101 and 103 overlap each other. Alternatively, the main chamber walls 201,203, and 205, the protruding chamber wall 110, and the closed chamber wall 207 may be formed with a One-Piece-Woven scheme.

The main chamber walls 201, 203, and 205 protrude toward the upper portion of the airbag 100 by a predetermined a length from the lower wall 106. The top ends of the main chamber walls 201, 203, and 205 are spaced apart from the upper wall 105 by a predetermined distance such that the upper portions of the front chamber 111, the middle chamber 113 and the rear chamber 115 are open.

The protruding chamber wall 220 includes: a vertical wall 221 extending upwardly from the lower chamber wall 106; and a transverse wall 223 extending from the upper end of the vertical wall 221 toward the front side of the vehicle and spaced apart from the upper wall 105 of the airbag 100 by a predetermined distance. The vertical wall 221 is configured such that the upper end of the vertical wall 221 is substantially curved toward the rear side of the vehicle.

The transverse wall 223 is spaced apart from the lower wall 106 by a predetermined distance such that an opening 0 is formed, which allows the protruding chamber 130 to fluidly communicate with the foremost chamber 150.

A connecting chamber 160 is formed above the protruding chamber 130 by the transverse chamber 223. The connecting chamber 160 allows the front chamber 111 to fluidly communicate with the foremost chamber 150. Through this configuration, the gas flows in the protruding chamber 130 via the foremost chamber 150.

The protruding chamber wall 220 is laid on the inner panel 101 of the main chamber 110, and the main chamber wall 201 is disposed outside the protruding chamber 130. Through this configuration, the front chamber 111 of the main chamber 110 is substantially adjacent to the foremost chamber 150.

Two points in an upper non-inflation area A1 above the protruding chamber 130, which will be described later, are connected to each other by a first connecting means 251, and the two points in a lower non-inflation area A2 below the protruding chamber 130, which will be described later, are connected to each other by the second connecting means 253. As a result, the two points, at which the first and the second connecting means 251 and 253 are arranged, become hinge points of the protruding chamber 130 upon inflation of the airbag.

One end of a front strap 191 is coupled to a middle portion of the front end of the airbag 100, and an opposite end of the front strap 191 is coupled to the vehicle front body, such as the front pillar 11. The front strap 191 gives a transversal tensional force to the airbag 100, thereby preventing the airbag 100 from being deployed toward the rear side of the vehicle upon deployment of the airbag 100.

FIG. 4 is a view showing a state that a portion where the protruding chamber of FIG. 2 is formed is fully un-folded.

Referring to FIG. 4, in early manufacturing the airbag, the main chamber 110, the protruding chamber 130, and the foremost chamber 150 are laid on the same plane without an overlap.

A cutting line 261 is formed in a non-inflation area A3 between the main chamber 110 and the protruding chamber 130. The cutting line 261 is formed in the non-inflation area A3 between the front chamber wall 201 defining the front chamber 111 of the main chamber 110 and the protruding chamber wall 220 defining the protruding chamber 130.

The cutting line 261 enables the protruding chamber 130 to overlap with the inner panel 101 of the main chamber 110.

A first upper point P1 and a second upper point P2 are provided in the upper non-inflation area A1 above the protruding chamber 130, and a first lower point P3 and a second lower point P4 are provided in the lower non-inflation area A2 below the protruding chamber 130.

The first lower point P3 is disposed at a location which is spaced by a first distance L1 from the first upper point P1 toward the rear side of the vehicle, and the second lower point P4 is disposed at a location which is spaced by a second distance L2 from the second upper point P2 toward the front side of the vehicle.

In another embodiment of the invention, the first upper point P1 and the first lower point P3 may be disposed on the same vertical line, and the second upper point P2 and the second lower point P4 may be disposed on the same vertical line.

FIG. 5 is a partial side view showing a state that a protruding chamber of a side curtain airbag for a vehicle is unfolded according to an embodiment of the present invention, and FIG. 6 is a partial side view showing a state that a protruding chamber of a side curtain airbag for a vehicle overlaps with a main chamber according to an embodiment of the present invention.

Referring to FIGS. 2 and 5, firstly, the inner panel 101 is laid on the outer panel 103 when the airbag is early manufactured.

Next, the upper and lower walls 105 and 106, the front and rear walls 107 and 108, the main chamber walls 201, 203, and 205, the protruding chamber wall 220, and the closed chamber wall 207 are formed. These walls may be formed by various schemes, such as sewing, adhesive and one-piece woven schemes.

Referring to FIG. 5, the upper portion above protruding chamber 130, namely, a portion where the connecting chamber 160 is formed is folded by folding schemes, such as pleat-folding schemes.

Firstly, the connecting chamber 160 portion between the first upper point P1 and the second upper point P2 is folded through at least two folding lines F1 and F2 in a zigzag arrow direction B such that the first upper point P1 and the second upper point P2 overlap each other.

Referring to FIG. 6, since the protruding chamber 130 is partially separated from the front chamber 111 of the main chamber 110 through the cutting line 261, the protruding chamber 130 overlaps with the front chamber 111 of the main chamber 110 when the connecting chamber 160 portion of the airbag 100 is folded. As a result, the first lower point P3 and the second lower point P4 overlap each other. In addition, the front chamber wall 201 defining the front chamber 111 is substantially arranged outside the protruding chamber 130. Accordingly, the front chamber 111 is adjacent to the foremost chamber 150.

The first upper point P1 and the second upper point P2, which overlap each other as described above, are connected to each other by the first connecting means 251. The first lower point P3 and the second lower point P4 overlapping each other are connected to each other by the second connecting means 253.

Herein, the first lower point P3 is disposed at a location which is spaced by a first distance L1 from the first upper point P1 toward a rear side of the vehicle, and the second lower point P4 is disposed at a location which is spaced by a second distance L2 from the second upper point P2 toward the front side of the vehicle. Accordingly, when the first lower point P3 and the second lower point P4 overlap each other, and the first lower point P3 and the second lower point P4 are coupled to each other through the second connecting means 253, the protruding chamber 130 portion is clockwise rotated about the connected point at which the first upper point P1 and the second upper point P2 are coupled to each other through the first connecting means 251.

Through this configuration, upon deployment of the curtain airbag, the characteristic that the protruding chamber 130 protrudes toward the interior of the vehicle is improved, thereby enhancing the effect of preventing the head portion of the occupant from being ejected toward the front side of the vehicle.

The first and second connecting means 251 and 253 include a sewing line, an adhesive line, a radio frequency welding line, a heat sealing line, and the like.

In the following descriptions, the point at which the first upper point P1 and the second upper point P2 are coupled to each other through the first connecting means 25, will be referred to as the "upper hinge point H1", and the point, at which the first lower point P3 and the second lower point P4 are coupled to each other through the second connecting means 253, will be referred to as the "lower hinge point H2". Hereinafter, operation principles of the side curtain airbag configured as described above will be described.

FIG. 7 is a view showing an inflated state of the side curtain airbag for a vehicle according to an embodiment of the present invention, and FIG. 8 is a sectional view taken along the line VIII-VIII of FIG. 7.

Referring to FIGS. 7 and 8, upon a vehicle side impact collision or rollover, firstly, the sensor (not shown) provided in the vehicle senses the impact, and an ignition signal is transmitted to the inflator 3. As a result, the gas generator in the inflator 3 burns. The generated gas is supplied to the airbag 100. Upon receiving the gas from the inflator 3, the airbag 100 inflates and deploys downwardly along the interior side surface of the vehicle, thereby protecting the occupant.

The gas generated from the inflator 3 flows toward the front and rear sides of the airbag 100.

The gas flows to the front portion of the middle chamber 113, the front chamber 111, and then to the foremost chamber 150 while flowing toward the front side of the vehicle, so that the middle chamber 113, front chamber 111, and the foremost chamber 150 inflate and deploy. Herein, the gas in the foremost chamber 150 flows in the protruding chamber 130 through the opening O.

In addition, the gas flows to the rear portion of the middle chamber 113, and then to the rear chamber 115 while flowing toward the rear side of the airbag, so that the middle chamber 113 and the rear chamber 115 inflate and deploy (see FIG. 2).

As described above, upon inflation and deployment of the airbag, the protruding chamber 130 is pressed by the inflation force of the front chamber 111 toward the interior of the vehicle. As a result, the protruding chamber 130 is inflated while being slightly rotated about the upper and lower hinge points H1 and H2 toward the front side of the vehicle.

Since the protruding chamber 130 is disposed to overlap with the inner panel 101 of the front chamber 111 upon early inflation of the airbag, the protruding chamber 130 is deployed while being substantially directed to the rear side of the vehicle. As a result, upon a vehicle collision, the head portion (D: head portion of the dummy in FIG. 7) of the occupant is early prevented from being ejected toward the front side of the vehicle, thereby effectively protecting the head portion of the occupant.

In an embodiment of the invention, the protruding chamber 130 is configured to be supported by a driving seat side airbag 300, which is inflated and deployed from a steering wheel body W toward the rear side of the vehicle.

Through this configuration, the protruding chamber 130 blocks off the gap between the curtain airbag 100 and the driving seat side airbag 300, so that the head portion of the occupant can be prevented from being inserted into the gap between the curtain airbag 100 and the driving seat side airbag 300, thereby preventing the head portion of the occupant from being ejected toward the front side of the vehicle.

In another embodiment, the protruding chamber 130 may be restrained by restraint members, such as tether, string, and other equivalent members so as to prevent the protruding chamber 130 from being directed toward the front side of the vehicle upon inflation. In this configuration, the head portion of the occupant is early prevented from being ejected toward the front side of the vehicle.

In still another embodiment of the present invention, the curtain airbag may be configured without the cutting line 261. In this case, the protruding chamber 130 portion is substantially folded such that the first upper point P1 and second point P2 overlap each other, and the first lower point P3 and the second lower point P4 overlap each other. After the protruding chamber 130 portion is folded, the first upper point P1 and second upper point P2 are coupled to each other through the first connecting means 251, and the first lower point P3 and the second lower point P4 are coupled to each other through the second connecting means 253.

Although the exemplary embodiments of the present invention have been described, it is understood that the exemplary embodiments help one ordinary skilled in the art to easily realize the present invention should not be limited to these exemplary embodiments and accompanying drawings. Therefore, various changes and modifications can be apparently made by the skilled in the art without departing from the technical sprit of the present invention. In addition, it is understood that parts that can be easily changed by the skilled in the art are within the spirit and scope of the present invention as hereinafter claimed.

The invention claimed is:

1. A side curtain airbag for a vehicle, the side curtain airbag comprising:

a main chamber for inflation and deployment along an interior side surface of the vehicle;
a foremost chamber extending from a front end of the main chamber toward a front side of the vehicle to be downwardly deployed from a front pillar of the vehicle;
a protruding chamber disposed at a front side of the main chamber to further protrude toward an interior of the vehicle relative to the main chamber, the protruding chamber disposed between the main chamber and the foremost chamber; and
a cutting line arranged between the main chamber and the protruding chamber to partially separate the protruding chamber from the main chamber such that the protruding chamber overlaps with a portion of the main chamber upon non-inflation of the airbag;
wherein the protruding chamber is defined by a protruding chamber wall, the protruding chamber wall comprising;
a vertical wall protruding upwardly from a lower portion of the airbag;
a transverse wall extending from a top end of the vertical wall toward the front side of the vehicle and spaced from an upper end of the curtain airbag by a predetermined distance, and
wherein the cutting line is formed in a non-inflation area around the vertical wall and the transverse wall.

2. The airbag of claim 1, wherein a first upper point and a second upper point in a non-inflation area above the transverse wall are coupled to each other by a first connection after an upper portion above the transverse wall is folded through at least one folding line, and
a first lower point in a non-inflation area below the main chamber and a second lower point in a non-inflation area below the protruding chamber are coupled to each other by a second connection after the protruding chamber and the main chamber overlap each other.

3. The airbag of claim 2, wherein the first lower point is disposed at a location which is spaced by a first distance from the first upper point toward a rear side of the vehicle, and
the second lower point is disposed at a location which is spaced by a second distance from the second upper point toward the front side of the vehicle.

4. The airbag of claim 3, wherein the upper portion above the transverse wall is folded in a zigzag direction such that the second upper point is moved in a rear direction of the vehicle.

5. The airbag of claim 1, wherein the protruding chamber is configured such that a front side of the protruding chamber is supported by a driving seat side airbag inflated and deployed from a steering wheel body of the vehicle.

6. A side curtain airbag for a vehicle, the side curtain airbag comprising:
a serial main chamber that inflates and deploys along an interior side surface of the vehicle;
a foremost chamber extending from a front end of the main chamber toward a front side of the vehicle to be downwardly deployed from a front pillar of the vehicle;
a protruding chamber disposed at a front side of the main chamber to further protrude toward an interior of the vehicle relative to the main chamber, the protruding chamber disposed between the main chamber and the foremost chamber; and
a cutting line arranged between the main chamber and the protruding chamber to partially separate the protruding chamber from the main chamber such that the protruding chamber overlaps with a portion of the main chamber upon non-inflation of the airbag,
wherein the protruding chamber is configured such that a front side of the protruding chamber is supported by a driving seat side airbag inflated and deployed from a steering wheel body of the vehicle.

7. The airbag of claim 6, wherein a first upper point and a second upper point in a non-inflation area above the transverse wall are coupled to each other by a first connection after an upper portion above the transverse wall is folded through at least one folding line, and
a first lower point in a non-inflation area below the main chamber and a second lower point in a non-inflation area below the protruding chamber are coupled to each other by a second connection after the protruding chamber and the main chamber overlap each other.

8. The airbag of claim 7, wherein the first lower point is disposed at a location which is spaced by a first distance from the first upper point toward a rear side of the vehicle, and
the second lower point is disposed at a location which is spaced by a second distance from the second upper point toward the front side of the vehicle.

9. The airbag of claim 8, wherein the upper portion above the transverse wall is folded in a zigzag direction such that the second upper point is moved in a rear direction of the vehicle.

10. The airbag of claim 6, further comprising a front chamber horizontally between the main chamber and the protruding chamber.

11. A side curtain airbag for a vehicle, the side curtain airbag comprising:
a main chamber extending in a horizontal direction forwardly from a rear end of the side curtain airbag;
a foremost chamber at a forward end of the side curtain airbag;
a protruding chamber horizontally positioned between the main chamber and the foremost chamber, the protruding chamber adapted to protrude further toward an interior of the vehicle relative to the main chamber, the protruding chamber defined by a lower edge of the side curtain airbag, a vertical wall and a transverse wall;
a cutting line between the main chamber and the protruding chamber partially separating the protruding chamber from the main chamber such that the protruding chamber overlaps with a portion of the main chamber upon non-inflation of the airbag, the cutting line formed in a non-inflation area around the vertical wall and the transverse wall.

12. The airbag of claim 11, wherein the transverse wall extending from a top end of the vertical wall toward a front side of the vehicle and spaced from an upper end of the curtain airbag.

13. The airbag of claim 10, wherein a first upper point and a second upper point in a non-inflation area above the transverse wall are coupled to each other by a first connection after an upper portion above the transverse wall is folded through at least one folding line, and
a first lower point in a non-inflation area below the main chamber and a second lower point in a non-inflation area below the protruding chamber are coupled to each other by a second connection after the protruding chamber and the main chamber overlap each other.

14. The airbag of claim 11, wherein a first upper point and a second upper point in a non-inflation area above the transverse wall are coupled to each other by a first connection after an upper portion above the transverse wall is folded through at least one folding line, and a first lower point in a non-inflation area below the main chamber and a second lower point in a non-inflation area below the protruding chamber are coupled to each other by a second connection after the protruding chamber and the main chamber overlap each other.

15. The airbag of claim 14, wherein the first lower point is disposed at a location which is spaced by a first distance from the first upper point toward a rear side of the vehicle, and the second lower point is disposed at a location which is spaced by a second distance from the second upper point toward the front side of the vehicle.

16. The airbag of claim 13, wherein the upper portion above the transverse wall is folded in a zigzag direction such that the second upper point is moved in a rear direction of the vehicle.

17. The airbag of claim 11, wherein the main chamber is adapted to inflate and deploy along an interior surface of the vehicle.

18. The airbag of claim 11, wherein the foremost chamber extends from a front end of the main chamber toward the front side of the vehicle to be downwardly deployed from a front pillar of the vehicle.

19. The airbag of claim 11, further comprising a front chamber horizontally between the main chamber and the protruding chamber.

20. The airbag of claim 18, wherein the front chamber is separated from the main chamber by a main chamber wall, and the front chamber is separated.

\* \* \* \* \*